United States Patent [19]

Soutoul

[11] Patent Number: 5,193,153
[45] Date of Patent: Mar. 9, 1993

[54] SYSTEM FOR DETECTING OVERWRITING OF DATA IN A BUFFER MEMORY, PARTICULARLY FOR A DATA SWITCH

[75] Inventor: Michel Soutoul, Sceaux, France
[73] Assignee: Alcatel CIT, Paris, France
[21] Appl. No.: 459,407
[22] Filed: Dec. 29, 1989
[30] Foreign Application Priority Data
  Dec. 30, 1988 [FR] France ................................ 88 17503
[51] Int. Cl.$^5$ ...................... G06F 12/16; G11C 21/00; G11C 29/00
[52] U.S. Cl. ................................... 395/250; 395/425; 364/DIG. 2; 365/73; 365/78
[58] Field of Search .............. 365/73, 78, 221, 189.12; 395/425, 250; 377/66; 371/49.1; 364/DIG. 1, DIG. 2

[56] References Cited

U.S. PATENT DOCUMENTS

| | | |
|---|---|---|
| 3,680,055 | 7/1972 | Wilson . |
| 4,506,348 | 3/1985 | Miller et al. .......................... 365/73 |
| 4,751,675 | 6/1988 | Knauer .................................. 365/78 |
| 4,823,312 | 4/1989 | Michael et al. ....................... 364/900 |
| 4,888,739 | 12/1989 | Frederick ............................... 365/73 |
| 4,901,286 | 2/1990 | Theus ................................. 365/73 X |
| 4,933,840 | 12/1990 | Sera et al. ............................ 364/200 |
| 5,027,326 | 6/1991 | Jones .................................... 365/221 |
| 5,083,269 | 1/1992 | Syobatake et al. ......... 365/189.12 X |
| 5,146,564 | 9/1992 | Evans et al. ......................... 395/250 |

FOREIGN PATENT DOCUMENTS 0033672 8/1981 European Pat. Off. .

OTHER PUBLICATIONS

IBM Technical Disclosure Bulletin, vol. 23, No. 1, Jun. 1980, pp. 286–287, New York, US; L. S. Rogers: "Block buffer overrun control".
IBM Technical Disclosure Bulletin, vol. 9, No. 10, Mar. 1967, pp. 1334–1335, New York, US; M. C. Dales et al.: "First-in, first-out buffer controls."

Primary Examiner—Alyssa H. Bowler
Attorney, Agent, or Firm—Sughrue, Mion, Zinn, Macpeak & Seas

[57] ABSTRACT

Information concerning the access to a first-in first-out buffer memory for reading and writing operations is indicated by the use of two supplemental memories which provide availability and validity information based upon unoccupied location information indicating a buffer memory location where data has been read, valid occupied location information indicating a buffer memory location where data has not yet been read, and non-valid occupied location information indicating that the location in the buffer memory has been overwritten. For each character stored in the buffer memory, there is a corresponding bit in the respective supplemental memories. The value of the bits in the respective memories indicates the availability of the memory and whether an overwrite will occur. The information contained in the supplemental memories is updated by a writing operation depending upon the availability status of the buffer memory at the time of writing.

10 Claims, 2 Drawing Sheets

SYSTEM FOR DETECTING OVERWRITING OF DATA IN A BUFFER MEMORY, PARTICULARLY FOR A DATA SWITCH

FIELD OF THE INVENTION

The invention relates to systems for managing access to a data storage memory having limited capacity, by a writing device and a read device which are independent.

A configuration of this type appears notably in data switching systems such as that of the family of switches marketed under the name "Alcatel 8300".

The invention will be presented below more specifically in relation with this type of switch. Nevertheless, it can obviously by applied to any other area involving a buffer memory in which the data read operation is carried out independently of the writing of successive data in the memory.

BACKGROUND OF THE INVENTION

A data switch has the purpose of receiving digital data introduced by transmission lines, sorting such data, and then regrouping it in order to re-send it over suitable transmission lines.

Such lines are often associated by pairs, comprising a receive line and a send line providing a link with a similar remote station. These pairs of lines are connected in parallel to a bus referred to as the transmission bus, carrying line coupling modules which manage access of the transmission lines to the transmission bus. A transmission bus coupling module (CBT) provides transfer of the data received towards the processing means of the switch, and the transfer of the data that has been processed and regrouped in the switch, towards the sending lines connected to the transmission bus.

The transmission bus coupling module (CBT) interrogates the lines by polling cycles in send mode and then in receive mode. Systematically, if a line polled in receive mode is in possession of a received character, (a byte of data received from the line), the transmission bus coupling module performs, via the transmission bus, a data transfer cycle by means of which it recovers the character and stores it in its data memory in a buffer register dedicated to the line that was interrogated in receive mode (receive line memory). If a line polled in send mode calls for a character to be sent (data byte to be sent over the line), the transmission bus coupling module executes a data transfer cycle by means of which it takes the character to be sent from its data memory and transmits it to the line.

This invention more particularly concerns the receive mode line memory of the transmission bus coupling module.

These receive mode line memories are accessed by read and write devices which operate independently. Operation of the write device depends on occurrence of the enabling signal for access from the receive line to the transmission bus, and of the start of the data carried by the receive line. Operation of the read device is put under the control of access enablement to the processing means that are internal to the switch. When the receive mode line buffer memory has a limited capacity, reception overload can consequently occur, in other words the speed of writing into the memory is greater, in a lasting manner, than the speed of reading the preceding data. If the buffer memory is a rotating memory (of the FIFO type), this reception overload can manifest itself by the least recent data being overwritten with a consequent definitive loss of such data.

Systems are known which aim at managing reception overloads.

These known systems operate using a principal of monitoring the occupancy rate of the receive line memory, with marking of the passage beyond successive occupancy thresholds giving rise to the generation of interrupt signals to a supervisory microprocessor in charge of managing the transmission bus coupling module. Under command of such interrupt signals, this supervisory microprocessor commands partial or total readout of the buffer memory by initializing the read means through direct memory access (DMA). With a known system of this type, the risk of overwriting is kept in check. If the system operates perfectly, elimination of conditions for overwriting is achieved. Still, it is also possible to tolerate some overwriting of data. In this case, in a known manner, the system is provided with means for detecting character loss generally at the level of the means for processing the received data, which means command a repetition of the transmission of the lost data.

Whatever the operating conditions are, (overwriting eliminated or tolerated), this known mechanism for supervision using the generation of interrupt signals suffers from the disadvantage of tying up or monopolizing the microprocessor. The program run by the supervisory microprocessor must in effect include a supervisory task for the occupancy level of the receive line memory, which needs to be run for each line in receive mode, and this has the effect of burdening the administration microprocessor's overall power.

The framework of the invention is that of a transmission arrangement in which data overwriting is tolerated, and has notably the aim of providing a system for detecting overwriting of data at buffer memory level without the microprocessor responsible for administering the transmission bus coupling module requiring to manage a supervisory task for the whole set of buffer memories in the reception lines.

SUMMARY OF THE INVENTION

This objective, along with others which will become more clear later, is achieved through the aid of a system for detecting overwriting of data in a buffer memory, notably for a buffer memory assigned to the reception of data supplied by a transmission line and intended to be processed by a data switch, the memory being a rotating FIFO memory accessed, on the one hand, by first means for writing data originating from the reception line, the writing being performed as a function of the rate at which said data is supplied, and, on the other hand, by second means for reading the data in order to direct it towards processing means within the switch, the reading being under the control of the sequencing of the processing means.

The system includes means for describing the status of the data locations in the memory, where the status includes at least three distinct values:
 unoccupied location
 valid occupied location
 non-valid occupied location
and wherein the description means cooperate with the means for writing and for reading the data in the memory, in order to update the values adopted by the description means of the status of the data locations in the memory.

Advantageously,

The unoccupied status corresponds to a location where the data of has been read by the reading means.

The valid occupied status designates a location where the item of data has not yet been read, but which has not undergone overwriting (in other words has not been the object of a double writing operation since the last read operation).

The non-valid occupied status describes a memory location which has been subject to overwriting.

In one preferred embodiment, the system includes first means for describing the availability status of the memory for writing, where the description means for availability is updated by the means for reading the data in the memory, and second means for describing the validity of the data in the memory, such that the means for describing the validity is updated by the means for writing the data in the memory as a function of the availability status at the time of writing.

The cooperation of the means for describing availability, and the means for describing validity thus makes it possible, firstly, to detect overwriting of characters received at the reception line memory, and, secondly, to inform the administration microprocessor of such overwriting at the time the data are transferred by readout.

The software task of supervising occupancy levels attained in the receive line memory can hence be eliminated in the microprocessor.

Preferably, the availability description means and the validity description means are each implemented in the form of a flags table, each flag being constituted by a bit associated with at least one record in the memory.

Advantageously, the availability and/or validity means are accessed by the read means simultaneously with the access to the data storage memory.

In accordance with one essential characteristic of the invention, the processing means are alerted or informed of overwriting in the buffer memory by the fact that the read means acquire data validity information for each one of the items of data read in the buffer memory and that fault signaling means addressed to the processing means are activated when the validity information is at the "non-valid" status.

Advantageously, the means for forming the data validity information comprise means for calculating and recording a parity bit for each item of data written into the buffer memory, and means for forcing the parity bit to "fault" for each item of data at readout in the buffer memory as a function of the status of the means for describing validity of the data.

In one advantageous manner of carrying out the invention, the system includes means for rejecting the current frame and activating a procedure for frame recovery when the signaling means are at the "fault" status.

Implementation of the invention hence makes it possible to release the administration microprocessor from a highly monopolizing task, while avoiding the need to perform management of the buffer memory by means of read/write pointers or the like.

The system according to the invention corresponds perfectly to the situation where there is total independence of the write and read means for the buffer memory, at the price of a slight increase in memory overhead, but with the provision of a decisive advantage in the simplicity of managing data overwrite.

In one particular embodiment of the invention, the writing means comprise means for loading frames of data in blocks of N maximum items of data (N being less than the capacity of the memory) and means for marking the ends of the blocks loaded into the memory, where the marking means cooperating with means for sending a signal for activating the read means when at least one block of data is present in the memory.

Advantageously, the means for sending an activation signal include a counter for the number of frames present in the memory, where counter is incremented by the data block loading means, and decremented by the read means, as well as means for sending an interrupt signal towards a command microprocessor for the read means when the counter marks a non-zero value.

Other characteristics and advantages of the invention will become more clear from reading the description that follows of one embodiment that illustrates the invention and should not be considered as limiting, in conjunction with the attached drawings.

DETAILED DESCRIPTION OF A PREFERRED EMBODIMENT

Figure 1:
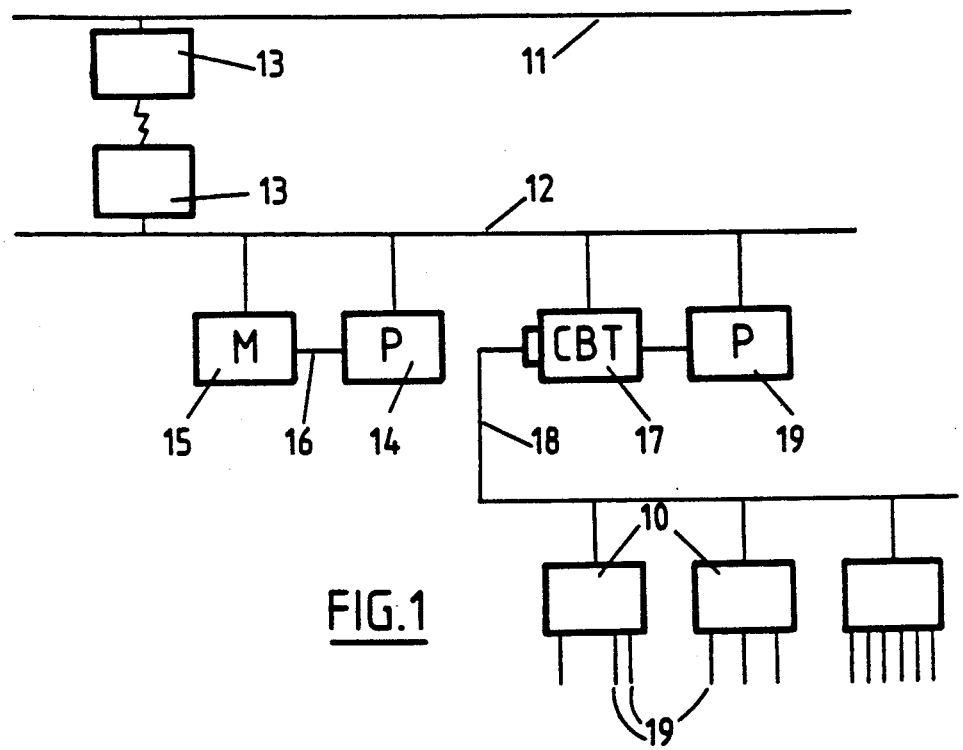
FIG. 1 is a schematic representation of the general architecture of a data switch provided with a transmission bus coupling module, in which the transmission bus handles connection of pairs of send/receive lines capable of association with a data overwrite detection system in accordance with the invention, in each buffer memory associated with the receive lines.

In the example adopted for the detailed description below, the data switch includes processing means formed by main buses 11 and 12 mutually connected by bus coupling modules 13. On each main bus 11 and 12, a set of processors 14 is connected, optionally associated with a local memory 15 via a local bus 16.

The processors receive input data and then restitute processed data by a transmission bus coupling module (CBT) 17 with administration microprocessor 9 connected to the main bus 12 and the transmission bus 18. Link lines 19, associated in a pairwise manner, comprising a receive line and a send line handle transmission of data to and from a remote station. The pairs of lines 19 are connected in parallel to the transmission bus 18 via line coupling modules 10, provided with modems.

By way of example, a transmission bus can have up to some thirty line coupling modules to which up to eight lines can be connected. The capacity of the transmission bus coupling module 17 may however be greater than the total connection capacity of the line coupling modules, in order to avoid saturation. The number of line coupling modules in excess results from a need to provide separate coupling modules for individual types of lines.

The function of the line coupling modules 10 is to put the characters sent in parallel form by the transmission bus coupling module 17 and intended to be sent over a transmission line 19 into series form (data bytes to be sent), and inversely to put the characters received (data bytes received) over transmission lines 19 into parallel form, for transmission toward the transmission bus coupling module 17 and then the processing means of the switch.

Figure 2:
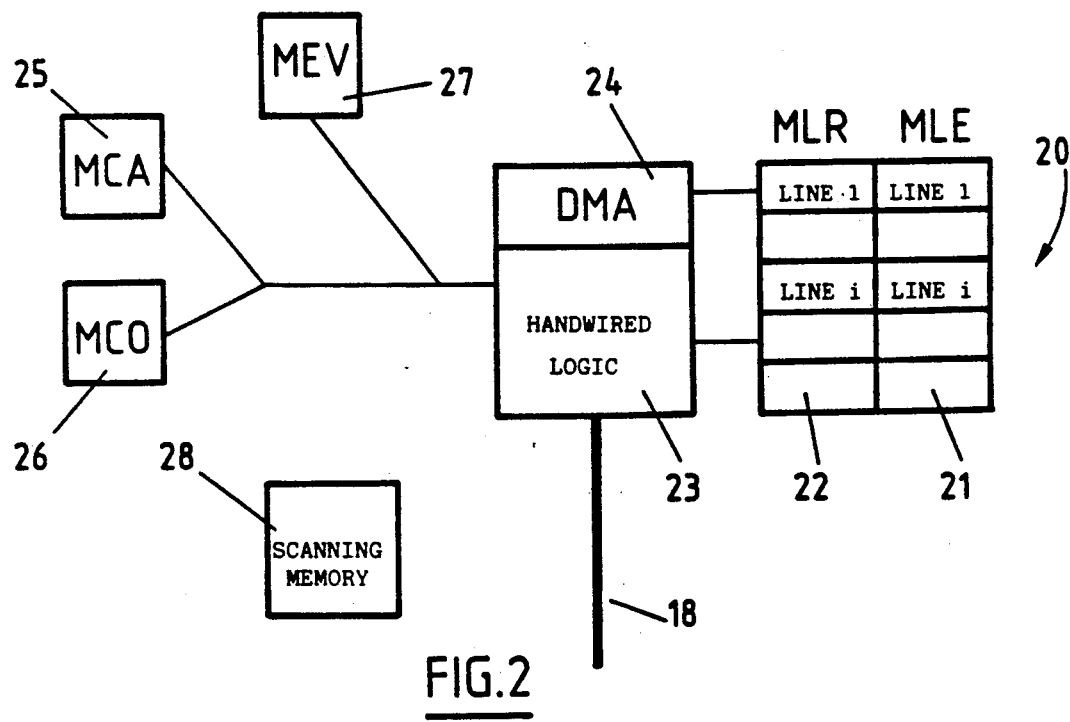
FIG. 2 is a schematic representation of the logic structure of a transmission bus coupling module comprising a buffer memory for data in send and receive mode, in a data switch of the type shown in FIG. 1.

As shown in FIG. 2, the transmission bus coupling module 17 includes a data memory 20 containing buffer memory spaces for data originating from the transmission lines (receive line memory 22), and intended to be sent over the transmission lines (send line memory 21).

The transmission bus coupling module 17 includes a device for polling the lines 19 one after the other. When a line requests a character to be sent and/or has a character received, the bus coupling module transmission 17 successively executes the following individual cycles, each cycle having a fixed duration T:

polling of the send line 51,
reading of the character in send line memory 52,
character transfer to line 53,
polling of the receive line 54,
received character transfer to the transmission bus coupling module 55,
writing of the character in the receive line memories 56.

Figure 5:
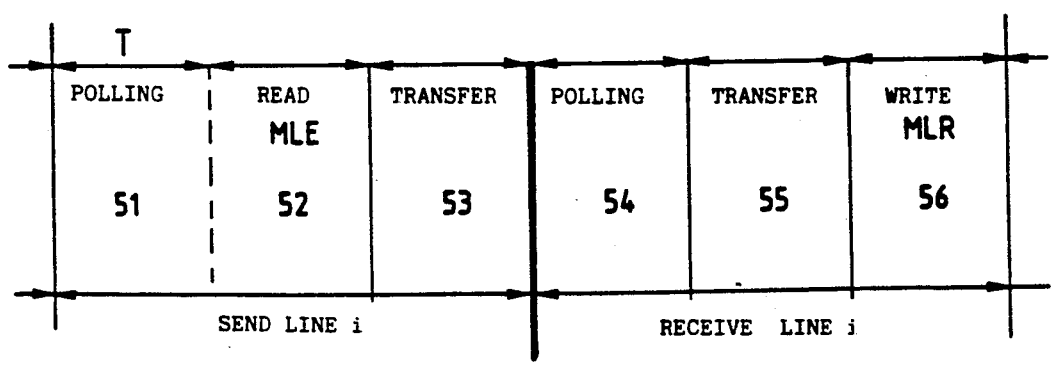
FIG. 5 shows the sequence of the send operations and then the receive operations over a line i comprising line pairs, connected to a data switch.

These stages are shown schematically in FIG. 5.

The first three operations 51, 52, 53 correspond to a sending phase on line i. The last three operations 54, 55, 56 correspond to a receive phase for data supplied by the line i.

Advantageously, and in accordance with one notable characteristic of the invention, the total duration of six individual cycles corresponding to the juxtaposing of the six stages 51 to 56 can be decreased to a duration of five cycles (5T) by fusing of the two operations of polling the line in send mode 51 and of reading the send line memory character 52. In effect, by modifying the logic of the transmission bus coupling module 17 so as to make it systematically read the character to be sent in the send line memory during polling of the line in send mode, the instantaneous capacity of the transmission bus coupling module is improved by 1/6th (16.7%) under full load. When the character read is meaningless (the result of polling of the line indicating that it doesn't call for a character to be sent) the character read is simply ignored.

Interrogation of each one of the lines i by the transmission bus coupling module is done following a polling sequence stored in a line scanning memory. This polling sequence depends notably on the throughput of the line.

FIG. 2 shows schematically the principal modules that make up transmission bus coupling module 17.

The coupling module includes means for writing to memory, constituted by a hardwired logic (state machine) 23, one of the functions of which is to recover the characters received from the transmission lines 19 in order to write them into data memory 20 following the characters received previously modulo the size of the rotating FIFO memory.

The characters are read in memory 20 by means of a direct memory address (DMA) hardwired logic 24 activated by the administration microprocessor 9 associated with the transmission bus coupling module 17.

The hardwired logic 23 operates in cooperation with an address counter memory 25, a byte counter memory 26 and an event counter memory 27. Moreover, the hardwired logic 23 polls the lines connected to the transmission bus 18 in accordance with scanning sequences stored in the scanning memory 28.

The address counter memory 25 stores the address pointers of each line memory, in send or receive mode of a character passing through the data memory 20.

Figure 3:
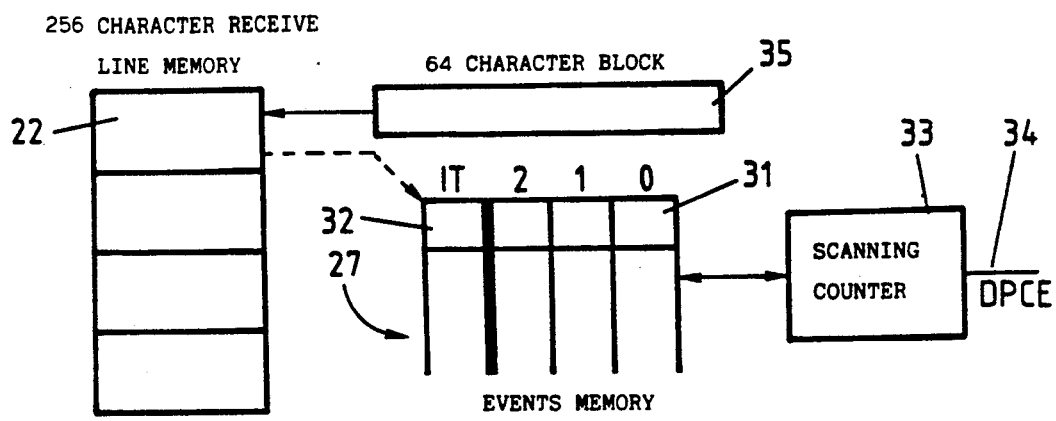
FIG. 3 is a schematic representation of the operation of the sequence of activation of the read means for the receive line memory via an events memory and a scanning or polling count.

The byte counter memory 26 carries out counting which makes it possible to manage the send line memory 21 and the receive line memory 22 per character block (see explanation details with reference to FIG. 3).

Independence of the hardwired logic 23 write throughput and the DMA 24 read throughput does not pose any problem relative to management of the send line memory 21. In fact, the transmission bus coupling module 17 is in control of sending, and commands writing into memory as a function of the content of the byte counter 26 associated with hardwired logic 23, as the memory in send mode is progressively emptied or output onto the transmission lines 19. The only incident that could be envisioned would not be saturation, but complete emptying of the send line memory 21, at the precise moment where the line is called. In this case, the remote receiver would note the presence of a fault on the line and would order the current frame to be retransmitted.

The risk of saturation appears specifically in relation with the receive line memory 22. The command sequence for reading in the receive line memory is shown schematically in FIG. 3. The receive line memory is partitioned into memory segments corresponding to each one of the lines polled; FIG. 3 shows a segment of the receive line memory 22, having a capacity of 256 characters in the example shown. Filling of the memory segment is carried out by blocks 35, of a maximum of 64 characters. These blocks are divided up within the frames received. The characters in a given block should belong to the same frame, which means that the end-of-frame blocks are almost systematically less than 64 characters. Marking is performed in the receive line memory for each end of frame, or, failing this, when 64 characters have been written into the receive line memory since the last marking operation.

Each marking operation constitutes an event. For each event, the transmission bus coupling module increments a cumulative counter 31 in event memory 27. The cumulative event counter 31 can advantageously adopt a value of 1 to 7, on three bits.

When the administration microprocessor 9 commands emptying of part or all of the receive line memory 22 (which is done block by block), the transmission bus coupling module executes a DMA transfer 24 and alerts the microprocessor 9 at the end of transfer. The latter then decrements the cumulative counter 31.

The administration microprocessor 9 is informed of filling of the memory by means of interrupt signals indicating for example that at least one block exists in memory (the cumulative counter 31 indicating a non-zero value). An interrupt flag 32 in event memory 27, can be set to an interrupt masking state.

Interrupt generation is carried out via a scanning counter 33 which sequentially addresses the event memory 27. The scanning counter 33 stops each time the interrupt masking bit 32 is in its unmasked position, and the cumulative counter 31 shows a value different from zero. When the halt or stop conditions are satisfied, an interrupt DPCE 34 is generated.

For receiving long frames greater than 256 characters, when the cumulative counter 31 reaches the value 4, the receive line memory 22 is full. If the administration microprocessor 9 is slow in handling the events, the line memory 22 is not emptied fast enough and the new characters received are then going to get written in place of the first ones; there is then overwriting of characters in the receive line memory 22.

The invention manages this overwrite situation by means of two principles:
- detection and marking of character overwriting in receive line memory 22;
- signaling of the fault to the administration microprocessor 9 only at the moment of the DMA read of the characters in memory 22.

The detection principle is based on the fact that the hardwired logic 23 can only validly write to receive line memory 22 if the character which it had previously written at the same address has been emptied by the DMA 24. In the opposite case, writing of the current character overwrites the preceding character which has not yet been read, and the frame currently being received is lost.

Figure 4:
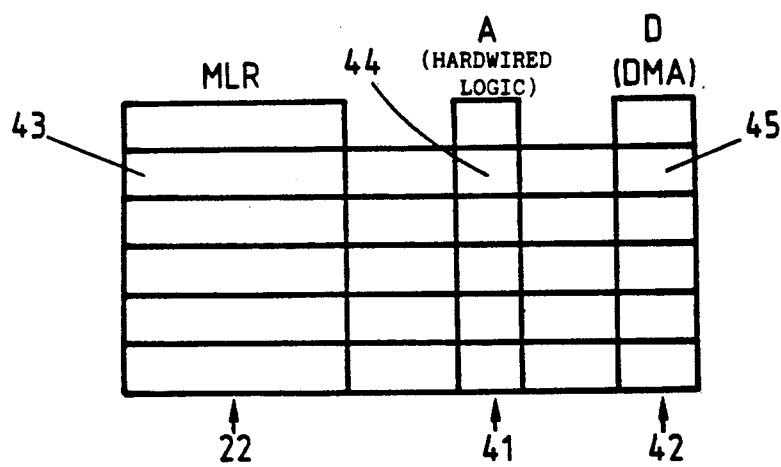
FIG. 4 is a schematic representation of the organization of availability and validity flags tables according to the invention in relation with the organization of the receive memory.

For each receive line memory 22 (256 bytes) two supplementary memories 41 and 42 each of 256 bits (FIG. 4) are available. These two memories 41, 42 receive the same addresses as the receive line memory 22. For each character 43 stored in a record of the receive line memory 22, there is one corresponding bit 44, 45 in each respective supplementary memory 41, 42.

The first supplementary memory 41 is referred to as memory A and constitutes a means for describing the validity of the receive line memory 22.

The second supplementary memory is referred to as memory D, and constitutes a means of describing the availability of the receive line memory for writing of a new character.

When DMA 24 reads a character 43 in receive line memory 22, the bit having the same address in D 42 is set to 1. This signifies that the corresponding address in receive line memory 22 now becomes available and that hardwired logic 23 will not cause character overwriting when it performs a write operation.

When hardwired logic 23 writes a character into receive line memory 22, it sets the corresponding bit 45 in D 42 to zero. This bit will then only be able to be set to 1 by DMA 24.

If, when hardwired logic 23 writes a character to receive line memory 22, the corresponding bit 45 in D 42 is at 1, the character received is written to an unoccupied address and overwriting does not occur. It then marks the validity of the character by setting the bit 44 with the same address in the memory A 41 to 1.

If, when hardwired logic 23 is writing a character into receive line memory 22, the corresponding bit in D 42 is at zero, the character received is in the course of being written at an address where a character has not yet been made use of by the DMA 24, and this character is destroyed as a result of the new character being written. Hardwired logic 23 then marks the received frame as non-valid by setting the same address bit in memory A 41 to zero.

Memory A 41 then records the validity of the characters received.

The principle by which frames having overwritten characters is signaled is as follows.

Each character in receive line memory 22 is accompanied by a parity bit. When hardwired logic 23 writes to receive line memory 22, the parity of the character received is calculated and recorded. When DMA 24 reads the character in receive line memory 22, the parity of the character is again calculated and is compared with the parity that was recorded. Should there fail to be agreement, DMA 24 writes this fault into a status word which will be used at the end of DMA transfer by the administration microprocessor 9. Where there has been a fault, the operating system rejects the frame and initiates a (known) procedure enabling this frame to be received again.

Where overwriting of characters in receive line memory 22 has occurred, the corresponding frame is not valid. The signaling principal then consists in making use of the information contained in memory A 41 in order to generate, by forcing a parity error, faulty parity which will lead to the received frame being rejected and the recovery procedure being activated.

During reading by DMA 24 of a character 43 in the receive line memory 22, the value of the corresponding bit in A 44 is tested. If the value of bit A 44 is zero, the value of the recorded parity bit is reversed and hence rendered so as not to conform to the value of parity as calculated. DMA 24 then records a parity error in the status word, which leads to the received frame being rejected.

Obviously, the system for overwrite detection using two supplementary memories A and D as described is but one way of carrying out the invention. The invention also covers any other alternative embodiment of the means for describing the status of the data locations in the memory, adapted to adopt at least three distinct values (available, valid occupied location, non-valid occupied location) in cooperation with means for writing and means for reading data in memory for updating said values.

What is claimed is:

1. A system for detecting overwriting of data in a buffer memory, said buffer memory being assigned to receive data supplied by a transmission line where said data is to be processed by a data switch, the buffer memory being a rotating FIFO memory accessed, on the one hand, by first means for writing data originating from a reception line, said writing being performed as a function of the rate at which said data is supplied, and said first means being able to overwrite data, and, on the other hand, by second means for reading the data in order to direct said data toward processing means within the switch, said reading being under the control of a sequencing of the processing means,
    wherein the system further includes description means for describing the status of data locations in the buffer memory, by providing information indicating an unoccupied location where data has been read, a valid occupied location where data has not yet been read, and a non-valid occupied location indicating a location which has been overwritten.
    and wherein said description means cooperates with said first means for writing and said second means for reading the data in the buffer memory, in order to update said information provided by said description means of the status of the data locations in the buffer memory.

2. The system according to claim 1, wherein said description means includes availability description means for describing the availability status of the buffer memory for writing, said availability description means for availability being updated by said second means for reading the data in the buffer memory, and validity description means for describing the validity of the data in the buffer memory, said validity description means being updated by the first means for writing the data in the buffer memory as a function of the availability status at the time of writing.

3. The system according to claim 1, wherein said availability description means is constituted by a flags table, each flag being constituted by a bit associated with at least one record in the buffer memory.

4. The system according to claim 2, wherein said validity description means is constituted by a flags table, each flag being constituted by a bit associated with at least one record in the buffer.

5. The system according to claim 3, wherein said second means for reading data is arranged to access said availability description means and said validity description means simultaneously with said buffer memory.

6. The system according to claim 1, wherein said first means for writing data comprises data block loading means for loading frames of data in blocks of N maximum items of data (N being less than the capacity of the buffer memory) and means for marking the ends of the blocks loaded into said buffer memory, and wherein said marking means cooperates with signaling means for sending a signal for activating said second means for reading data when at least one block of data is present in the buffer memory.

7. The system according to claim 6, wherein said signaling means for sending an activation signal includes a cumulative counter for counting the number of frames present in the buffer memory, said counter being incremented by said data block loading means, and decremented by said second means for reading data, and interrupting means for sending an interrupt signal to a command microprocessor for the second means for reading data when said counter marks a non-zero value.

8. The system according to claim 1, wherein said second means for reading data acquires validity information for each item of data read in the buffer memory, and in that fault signaling means addressed to the processing means is activated when the validity information is at a "non-valid" occupied location status.

9. The system according to claim 8, wherein the validity description means for forming said data validity information comprises means for calculating and recording a parity bit for each item of data written into the buffer memory, and means for forcing the parity bit to "fault" for each item of data readout of the buffer memory as a function of the status of the validity description means for describing validity of the data.

10. The system according to claim 8, further comprising means for rejecting a current frame and activating a procedure for frame recovery when said signaling means are at the "fault" status.

* * * * *